US007691922B2

(12) United States Patent
Manning et al.

(10) Patent No.: US 7,691,922 B2
(45) Date of Patent: Apr. 6, 2010

(54) PERFORMANCE ENHANCEMENT IN THE STABILIZATION OF ORGANIC MATERIALS

(75) Inventors: Mark J. Manning, Santa Monica, CA (US); Marek J. Gnatowski, Coquitlam (CA); Christine Mah, Parker, CO (US); Cecilia L. Stevens, Vancouver (CA)

(73) Assignee: U.S. Borax Inc., Greenwood Village, CO (US)

( * ) Notice: Subject to any disclaimer, the term of this patent is extended or adjusted under 35 U.S.C. 154(b) by 116 days.

(21) Appl. No.: 11/631,804

(22) PCT Filed: Jul. 1, 2005

(86) PCT No.: PCT/US2005/023832

§ 371 (c)(1),
(2), (4) Date: Nov. 2, 2007

(87) PCT Pub. No.: WO2006/014428

PCT Pub. Date: Feb. 9, 2006

(65) Prior Publication Data

US 2008/0182931 A1   Jul. 31, 2008

Related U.S. Application Data

(60) Provisional application No. 60/585,408, filed on Jul. 3, 2004.

(51) Int. Cl.
*C08L 97/02* (2006.01)
(52) U.S. Cl. ......................................... 524/13; 524/405
(58) Field of Classification Search .................. 524/13, 524/14, 404, 405
See application file for complete search history.

(56) References Cited

U.S. PATENT DOCUMENTS

| | | | |
|---|---|---|---|
| 3,705,166 A | 12/1972 | Murayama et al. | |
| 4,064,102 A | 12/1977 | Hillard et al. | |
| RE30,385 E | 8/1980 | Hillard et al. | |
| 4,369,274 A | 1/1983 | Thomas | |
| 4,559,381 A | 12/1985 | Tapia et al. | |
| 4,879,083 A | 11/1989 | Knudson et al. | |
| 5,025,050 A | 6/1991 | Torres | |
| 5,093,395 A | 3/1992 | Torisu | |
| 5,130,352 A | 7/1992 | Chow | |
| 5,202,946 A | 4/1993 | Hardin et al. | |
| 5,393,812 A | 2/1995 | Haley et al. | |
| 5,705,545 A | 1/1998 | Avar et al. | |
| 5,861,451 A | 1/1999 | Schroeder et al. | |
| 5,976,417 A | 11/1999 | Bechtold et al. | |
| 6,093,760 A * | 7/2000 | Nishihara et al. | ............ 524/145 |
| 6,228,911 B1 | 5/2001 | Gilg | |
| 6,262,161 B1 * | 7/2001 | Betso et al. | ................. 524/425 |
| 6,368,529 B1 * | 4/2002 | Lloyd et al. | .................. 264/109 |
| 6,547,390 B1 | 4/2003 | Bernheim et al. | |
| 6,649,680 B2 | 11/2003 | Asano et al. | |
| 6,780,913 B2 | 8/2004 | Sawada et al. | |
| 6,825,253 B2 * | 11/2004 | Easter | .......................... 524/87 |
| 7,084,197 B2 * | 8/2006 | Chin et al. | ..................... 524/99 |
| 7,317,046 B2 * | 1/2008 | Fukuoka et al. | ............. 524/116 |
| 7,326,740 B2 * | 2/2008 | Stadler et al. | ................ 523/122 |
| 7,449,130 B2 * | 11/2008 | Lloyd et al. | .................. 252/385 |
| 2003/0071389 A1 * | 4/2003 | Manning et al. | ............ 264/122 |
| 2005/0215701 A1 * | 9/2005 | Porsch et al. | ................ 524/589 |
| 2006/0166023 A1 * | 7/2006 | Yoshikata et al. | ........... 428/523 |
| 2008/0233210 A1 | 9/2008 | Manning et al. | |

FOREIGN PATENT DOCUMENTS

| | | |
|---|---|---|
| EP | 1095964 A | 5/2001 |
| GB | 2245894 A | 1/1992 |

OTHER PUBLICATIONS

International Search Report and Written Opinion for International (PCT) Application No. PCT/US05/23832, mailed Jan. 19, 2006.
International Preliminary Report on Patentability for International (PCT) Application No. PCT/US05/23832, mailed Jan. 18, 2007.
Supplementary European Search Report on European Application No. 05768695.8, mailed Aug. 24, 2009.
Geoffrey Pritchard, "Plastics Additives: An A-Z reference", Chapman & Hall, 1998, pp. 353-355.
Pages, P., et al., "FTIR and DSC Study of HDPE Structural Changes and mehcanical Properties Variation When Exposed to Weathering Agin During Canadian Winter", Journtal of Applied Polymern Science, vol. 60, 153-159 (1996).
Gnatowski, Marek, et al., "Testing of Wood Plastic Composites", 7th International Conference on Wood-Plastics Composites in Madison, Wisconsin, May 19-20, 2003.
Gnatowski, M., et al., "Evaluation of Wood Plastic Composite Photodegredation Using Modern Microscopic and Spectroscopic methods", World Polymer Congress, Macro 2004, Jul. 4-9, 2004.
Manning, Mark, et al., "Borate Stabilisers and Preservatives in Wood-Plastic Composites", Wood-Plastics Composites conference in Vienna, Austria, Sep. 14-16, 2004.
U.S. Borax Inc. product brochure, "Borogard® ZB in Woodfiber-Plastic Composites", Oct. 2004.
Gnatowski, Marek, et al., "UV Stabilization of Wood Plastic Composites with Zinc Borate", World Polymer Congress, Macro 2006, Jul. 16-21, 2006.

* cited by examiner

*Primary Examiner*—Peter Szekely
(74) *Attorney, Agent, or Firm*—Kurt R. Ganderup

(57) ABSTRACT

The addition of zinc borate alone or together with a hindered amine light stabilizer and ultra-violet light absorber to organic materials such as thermoplastic polyolefin resin, as is common in wood-plastic composites, provides a substantial reduction in the ultra-violet light degradation of the resin in comparison with similar materials made without zinc borate. This could provide substantial improvements in the long term durability of wood-plastic composites and other organic materials which are used in exterior environments and subject to ultra-violet exposure from the sun.

21 Claims, No Drawings

PERFORMANCE ENHANCEMENT IN THE STABILIZATION OF ORGANIC MATERIALS

This application is the National Stage of International Application No. PCT/US2005/023832, filed Jul. 1, 2005, which claims the benefit under 35 U.S.C. 119(e) of U.S. provisional application No. 60/585,408, filed Jul. 3, 2004, the entire content of which is incorporated herein by reference.

FIELD OF THE INVENTION

This invention relates to improvements in the ultraviolet light stabilization of organic materials through the addition of selected borates, and particularly zinc borate.

BACKGROUND

Organic materials exposed to ultraviolet (UV) light undergo degradation, which may change their chemical composition and structure, mechanical properties, surface appearance, and color. This UV aging is associated with natural weathering of plastics, coatings, adhesives, waxes and other special materials exposed to exterior and some interior conditions. Natural and synthetic dyes lose their color and undergo fading when exposed to short wavelength light as well. Natural weathering of materials is a complex process where UV light interaction with matter plays a significant role but may not be the only factor. There are other factors associated with aging of materials containing organic compounds, for example heat or exposure to acidic conditions in the form of acid rain or air contaminants such as sulfur dioxide, etc.

SUMMARY

In one aspect, the invention provides a method of stabilizing organic material, optionally containing wood particles, against degradation by ultraviolet radiation. This method comprises incorporating from about 0.1 to 5 percent by weight boron compound, preferably zinc borate, boric acid or sodium borate into the organic material possibly containing photoinitiator(s), thereby forming an organic composition with improved light stability. The said percentage of boron compound is based on the total weight of the composition.

In another aspect, the invention provides a method for enhancing the light stabilizing performance of a hindered amine light stabilizer, said method comprising incorporating into an organic material from about 0.05 to 5 percent by weight of a hindered amine light stabilizer and from about 0.1 to 5 percent by weight boric acid salt, preferably zinc borate, and optionally wood particles and/or an ultraviolet light absorber, thereby forming an organic composition with enhanced light stability compared with the same composition without zinc borate, said percentages based on the total weight of the composition.

In yet another aspect, the invention provides a light stabilized composition comprising organic material and from about 0.1 to 5 percent by weight of boric acid salt, preferably zinc borate or sodium borate, and optionally a hindered amine light stabilizer, an ultraviolet light absorber and/or wood particles, said percentage based on the total weight of the composition.

In still another aspect, the invention provides a wood-plastic composite article comprising from about 30 to about 70 percent by weight of a polyolefin selected from the group consisting of polyethylene and polypropylene, from about 30 to about 70 percent by weight wood particles, from about 0.1 to 5 percent by weight boric acid salt, preferably zinc borate, from about 0.05 to 5 percent by weight of a hindered amine light stabilizer, and an ultraviolet light absorber, said percentage based on the total weight of the composition.

Another aspect of the invention provides a method of enhancement of light stabilization performance of above-mentioned materials composition, where said materials are exposed to acid environments.

DETAILED DESCRIPTION OF THE INVENTION

The invention provides a method for reducing ultraviolet (UV) light degradation in organic compositions such as thermoplastic resins through the addition of boron compounds, such as zinc borate, either alone or in combination with a hindered amine light stabilizer (HALS) and optionally a UV light absorber. It has been found, surprisingly, that the addition of zinc borate to many thermoplastic resin compositions, reduced the UV degradation of the resin compositions in comparison with thermoplastic resin made without zinc borate. This improvement in UV light stability was observed with the addition of zinc borate, whether added alone or together with HALS or a HALS/UV light absorber combination. This could provide substantial improvements in the long-term durability of organic compositions such as articles made of or containing thermoplastic resin which are used in exterior environments or are subject to substantial UV exposure from many sources, including exposure to sunlight. Examples of such organic compositions which would benefit from this improvement are high density polyethylene resin containing HALS or wood plastic composites containing thermoplastic resin and wood particles.

According to the invention, the addition of between 0.1 and 5% by weight boron compounds, such as zinc borate, and preferably between 1 and 3%, in the form of a fine powder with a median particle size of 20 microns or less, will provide enhanced protection of organic material against degradation due to UV radiation. A larger quantity of boron compounds, such as zinc borate, will likely give a similar enhancing effect; however, such a high level is generally not preferred due to excessive cost and possible adverse effects on the mechanical properties of polymeric material.

Suitable boron compounds include boric oxide, boric acid, cationic salts of boric acid, or mixtures thereof, and wherein the cations have an atomic or molecular weight less than 130 atomic mass units (AMU). Suitable cationic salts of boric acid include alkali metal borates, such as sodium or potassium borate, alkaline earth metal borates such as calcium or magnesium borate, and zinc borate. Cations with a lower atomic or molecular weight, such as less than 130 AMU, are preferred, as larger cations would tend to reduce the relative proportion of boron, thereby reducing the overall effectiveness of the boron compound. Furthermore, lower solubility boron compounds are preferred, as they reduce the tendency of the borate to leach out when the stabilized compositions are used in wet environments such as exposure to rain in exterior environments. Zinc borate, which has limited solubiity in water and a moderate cationic atomic weight, is a preferred boron compound.

Organic materials to which boric acid or boric acid salts such as sodium or preferably zinc borate may be added to improve UV light stabilization include plastics, rubbers, adhesives, coatings, waxes and dyes. Among plastics, polyolefins such as polyethylene and polypropylene are preferred organic materials for use of the methods of the invention, but other resins may also be used. In particular, polyethylene and polypropylene are of special interest with regard to their market importance. They are also used in wood plastic composites. In this application, where a large quantity of wood is present, zinc borate provides a dual benefit, functioning both as a light stabilizer and as a biocide, protecting wood against decay.

The synergistic improvement resulting from the use of zinc borate for example in combination with HALS in polymeric materials may be observed in a variety of forms. A reduction in oxidation in the polymer chain caused by UV exposure in compositions containing zinc borate in combination with HALS could be very distinct. This difference in oxidation can be detected during testing of polymers with Fourier Transform Infrared Spectroscopy (FTIR). Oxidation of polymers and particularly polyolefins exposed to UV light could be observed in the increase in intensity of infrared absorption bands around 1720 $cm^{-1}$ due to the creation of different quantities of carbonyl groups in the oxidised polymer chain as described in known literature (1. P. Pages, F. Carrasco, J. Saurina, and X. Colom, Journal of Applied Polymer Science, Vol. 60, p. 153-159 (1996) and 2. S. H. Hamid, A. G. Maddhah, F. S Qureshi, M. B. Amiu; "Weather Induced Degradation of Polyethylene: Infrared Spectroscopic Studies" The Arabian Journal of Science and Engineering, p. 503-531, Volume 13, Number 4, October 1988). The surface of the material may also show increased cracking after exposure to weathering.

In respect to stabilization of polymeric materials containing HALS, preferred hindered amines include bis(2,2,6,6-tetramethyl-4-piperidyl)sebacate, sold under the commercial name Tinuvin® 770 (Ciba Geigy), and a mixture of Poly[[6-[(1,1,3,3-tetramethylbutyl)amino]-1,3,5-triazine-2-4-diyl][(2,2,6,6-tetramethyl-4-piperidinyl)imino]-1,6-hexanediyl[(2,2,6,6-tetramethyl-4-piperidinyl)imino]]), butanedioic acid, dimethyl ester, and polymer with 4-hydroxy-2,2,6,6-tetramethyl-1-piperidine ethanol sold under the commercial name Tinuvin 783 (also from Ciba Geigy). Tinuvin®770 is known to be an effective light stabilizer with polymers such as polypropylene, high-density polyethylene, ethylene propylene diene monomer (EPDM) rubber, polystyrene, acrylonitrile butadiene styrene (ABS) terpolymer, styrene acrylonitrile (SAN) copolymer, acrylonitrile styrene acrylate (ASA) and polyurethanes. Similar effects may be achieved by other light stabilizers belonging to the HALS family. Hindered amines are preferably added in concentrations from about 0.1 to 5% by weight of the polymer.

Many UV absorbers, for example 2-(2H-Benzotriazole-2-yl)-4 methylphenyl, which is sold under the trade name Tinuvin® P (Ciba Giegy) are also useful when added in combination with the above-described HALS to enhance stabilizer performance. This abovementioned compound is known for its strong light absorbance in the region below 400 nm (e.g. ultraviolet region). Other UV absorbers that are compatible with the polymeric system may also be used.

One type of thermoplastic resin-containing article which will benefit from the methods of this invention is woodfiber-plastic composite (also known as wood-plastic composite). Woodfiber-plastic composites typically contain thermoplastic resin binder levels between 30% and 70% by weight of the total composite weight, with the remainder of the substrate comprising about 30-70% by weight wood particles, 1-5% by weight lubricants and other processing additives which are used to help improve the physical properties of the composite product. Woodfiber-plastic composites are generally made by heating the composite mixture so that the thermoplastic resin binder softens, making it pliable or plastic and therefore suitable for shaping, such as by extrusion. Some commonly used thermoplastic resins used in woodfiber-plastic composites include polyethylene, polypropylene and polyvinyl chloride (PVC). High density polyethylene (HDPE) is a preferred thermoplastic resin.

The woodfiber-plastic composite products are typically manufactured by mixing together all of the components and then heating the mixture above 300° F., e.g. up to about 400° F., in a device capable of additional mixing, such as a twin screw extruder, followed by extrusion through a die, (which may impart fibre orientation and a specific cross-sectional profile to the woodfiber-plastic composite) and then cooling in a water bath. The method of forming woodfiber-plastic composites is well known and is further described in U.S. Pat. Nos. 5,516,472 (May 14, 1996), 5,745,958 (May 5, 1998) and 6,153,293 (Nov. 28, 2000), the disclosures of which are incorporated herein by reference.

The surface of wood-plastic composites undergoes rapid weathering which is visible under a microscope in the form of crazing and a network of cracks exposing the wood. This is reflected in significant color change, particularly as whitening. Zinc borate has been found to retard the weathering of wood-plastic composites, which is primarily visible as a change in the infrared spectrum of the resin, caused by oxidation. It may be also visible as different color patterns after the exposure of such materials to UV light.

According to the methods of this invention, zinc borate, and optionally HALS and UV absorber, are added to wood-plastic composites in order to reduce photo-oxidation and UV degradation. The zinc borate may be mixed into either the wood particles or the resin prior to manufacture of the wood-plastic composites. HALS and UV absorber, if used, are preferably incorporated in with the resin material.

Tinuvin®770 was found to be sensitive to an acidic environment, which significantly reduces its activity. It is likely that many other HALS react similarly. Zinc borate was found to increase the pH of wood-plastic composites. This is likely one of the multiple factors responsible for the decrease in weathering of wood-plastic composites protected by HALS. It is also likely that the acidity of the wood-plastic composites may be increased by acid rain in the natural environment, resulting in even greater benefit from the addition of zinc borate to wood-plastic composites.

Zinc borate may also influence the photo-chemistry of the wood, which is visible through different patterns of color change in wood-plastic composites during weathering. Wood itself is known for a strong sensitivity to weathering and many compounds present in the wood likely act as photo-degradation initiatiors. Zinc borate may help neutralize these compounds.

Acid is a factor frequently encountered by materials exposed to natural environments. For example, wood is naturally acidic and may contain significant quantities of organic acids. Further increase in the wood acidic nature may be caused by decay fungi. Another example is rain, which has variable acidity depending on the conditions of cloud formation and precipitation. Maps of annual average rain acidity show pH readings in the region of 4.4 across the northeastern US, and significantly lower pH's have been recorded in some parts of Europe. Neutral conditions have a pH of 7.0, and lower pH indicates higher acidity. Many materials exposed to exterior conditions are therefore exposed to acidic conditions, and materials such as wood-plastic composite decking are exposed to acids both from rain and also from the presence of the acidic component in the material. In addition, prolonged exposure to acid rain may lead to the accumulation and concentration of acid in the materials. It is an important consid eration that many UV stabilizers, such as several HALS compounds, are reactive with acid and seem to show decreased activity in acidic conditions. The inherently acidic conditions of exterior exposure are also frequently not taken into consideration when materials are tested for weathering resistance in laboratory or even many exterior exposure experiments It is also expected that enhancement of light stabilization of organic materials by the combination of zinc borate with HALS packages containing hindered amines, UV absorbers, applies not only to polymeric materials, but also dyes and pigments. Polymeric materials which are stabilized with a combination of zinc borate and HALS may be used in a mixture with a variety of other components, for example, pigments, mineral or organic fillers, fire retardants, lubricants, blowing agents and other types of compatible stabilizers. In the case of the organic filler used in a plastic matrix, for example wood in wood plastic composite, zinc borate will supply additional protection against decay fungi. It is also expected that zinc borate may stabilize some materials by interaction with certain potential UV degradation initiators, removing them from the environment this way. On the other hand, it was also found that zinc borate does not seem to absorb UV radiation efficiently. The protection of materials against weathering in this manner, as is known for many pigments for example titanium dioxide or zinc oxide, is not a likely factor here.

The invention can be further explained in the following examples:

EXAMPLES

Example 1

Wood-plastic composite board samples were prepared by blending and extruding the thermoplastic material compositions listed in Table 1. The extruder used was a twin screw with 5 heating zones and a sheeting profile die designed for the extrusion of wood-plastic composites. The extrusion temperature was 345° F. The extruded boards, measuring 150 mm in width and 12-25 mm in thickness, were cooled on-line by sprayed water.

TABLE 1

Components of wood-plastic composite board samples tested (percent by weight)

| Sample # | Wood Flour Pine[1] | Wood Flour Oak[2] | HDPE Resin[3] | UV Stabilizer Package[4] | Zinc Borate[5] | Lubricants[6] | Talc[7] |
|---|---|---|---|---|---|---|---|
| 1 | 49.79 | — | 36.97 | 9.24[a] | 0 | 3.0 | 1.0 |
| 4 | 47.54 | — | 36.37 | 9.09[a] | 3.0 | 3.0 | 1.0 |
| 5 | 51 | — | 45 | 0 | 0 | 3.0 | 1.0 |
| 6 | 48.71 | — | 44.29 | 0 | 3.0 | 3.0 | 1.0 |
| 8 | 65.93 | — | 24.06 | 6.01[a] | 0 | 3.0 | 1.0 |
| 11 | 63.42 | — | 23.66 | 5.92[a] | 3.0 | 3.0 | 1.0 |
| 27 | — | 48.28 | 36.58 | 9.14[a] | 2.0 | 3.0 | 1.0 |
| 28 | — | 49.79 | 36.97 | 9.24[a] | 0 | 3.0 | 1.0 |
| 29 | — | 48.28 | 36.58 | 9.14[b] | 2.0 | 3.0 | 1.0 |
| 31 | — | 64.26 | 27.39 | 5.95[a] | 2.0 | 3.0 | 1.0 |
| 33 | — | 65.93 | 24.06 | 6.01[a] | 0 | 3.0 | 1.0 |

[1]Wood flour grade 2020 (American Wood Fibers Inc.)
[2]Wood flour grade 3720 (American Wood Fibers Inc.)
[3]HDPE - resin B-53 35H flakes (Solvay)
[4]UV stabilizer packages:
[a]Tinuvin ® 770 (Ciba Geigy) 5 wt. %, Tinuvin ® P (Ciba Geigy) 5 wt. %, metal oxides pigments-15 wt. %, HDPE (carrier) - 75 wt. %
[b]Tinuvin ® 783 (Ciba Geigy) 5 wt. %, Tinuvin ® P (Ciba Geigy) 5 wt. %, Metal oxides pigments-15 wt. %, HDPE (carrier) - 75 wt. %
[5]Zinc borate - Borogard ® ZB (U.S. Borax Inc.)
[6]Lubricants - blend of:
zinc stearate (Ferro Chemical) - 67 wt. %
EBS Wax (GE Specialty Chemicals) - 33 wt. %
[7]Talc - Nicron 403 (Luzenac America Inc.)

Example 2

Wood plastic composite mouldings were prepared by blending and extruding the thermoplastic material composition containing polypropylene resin, pine wood, lubricants, talc and optionally HALS, UV absorber and zinc borate as listed in table 2. The extruder used was a twin screw with five heating zones and a moulding profile die designated for extrusion of wood plastic composites. The extrusion temperature was about 380° C. The extruded mouldings measuring 37 mm in width and 9 mm in thickness were cooled on line by sprayed water.

TABLE 2

Components of wood plastic composite molding samples tested

| Sample # | Wood Flour Pine | PP Resin | UV Stabilizer Package[4] | Zinc Borate | Lubricants | Talc |
|---|---|---|---|---|---|---|
| 301 | 50 | 46 | — | 0 | 3 | 1 |
| 302 | 48 | 46 | — | 2 | 3 | 1 |
| 309 | 50 | 41 | 5[c] | 0 | 3 | 1 |
| 310 | 48 | 41 | 5[c] | 2 | 3 | 1 |
| 311 | 50 | 43.5 | 2.5[c] | 0 | 3 | 1 |
| 312 | 48 | 43.5 | 2.5[c] | 2 | 3 | 1 |
| 315 | 50 | 36 | 10[d] | 0 | 3 | 1 |
| 316 | 48 | 36 | 10[d] | 2 | 3 | 1 |

[4]UV stabilizer packages:
[c]Tinuvin ® 770 (Ciba Giegy) 5% wt, Tinuvin P (Ciba Giegy), 5 PBW, PP (carrier)90% wt
[d]Tinuvin ® 783 (Ciba Giegy) 5% wt, PP (carrier) 95% wt Example 3

High density polyethylene Escorene HD6706 (Exxon) was blended with Tinuvin® 770, or Tinuvin 783®. To selected blends, zinc borate, anhydrous borax or boric oxide was added as listed in table 3. All additives were prepared earlier in the form of masterbatches. Dry blends were extruded using Brabender ¾" single screw extruder equipped in mixing screw and strand die. The extruded strand was pelletized using a strand pelletizer. Plastic sheets with thickness 0.5 mm were moulded from plastic pellets using a hot press at 180° C. Moulded sheets were cooled with cold water while still under pressure.

TABLE 3

Components of polyethylene sheeting

| Sample # | HDPE | UV Stabilizer Package[1] | Borate Masterbatch[2] | Borate Compound |
|---|---|---|---|---|
| 041104-1 | 100 | — | — | — |
| 041104-4 | 84 | — | 16[j] | zinc borate |
| 041104-5 | 94 | 6[e] | — | — |
| 041105-3 | 78 | 6[e] | 16[j] | zinc borate |
| 050505-1 | 94 | 6[e] | — | — |
| 050505-8 | 78 | 6[e] | 16[j] | ZB |
| 050505-9 | 78 | 6[f] | 16[h] | boric oxide |
| 050505-11 | 78 | 6[e] | 16[j] | zinc borate |
| 050505-12 | 84 | — | 16[h] | boric oxide |
| 050505-13 | 84 | — | 16[i] | sodium borate |

[1]UV stabilizer package:
[e]Tinuvin ® 770 (Ciba Geigy) 5% wt, HDPE 95% wt
[f]Tinuvin ® 783 (Ciba Geigy) 5% wt, HDPE 95% wt
[2]Borate masterbatch:
[h]Boric oxide (US Borax) 25% wt, HDPE 75% wt
[i]Anhydrous sodium borate (US Borax) 25% wt, HDPE 75% wt
[j]Borogard ZB ® zinc borate (US Borax) 25% wt, HDPE 75% wt Example 4

For accelerated weathering specimens measuring 70 mm×100 mm were cut from the extruded boards made in Example 1. Moldings made in example 2 were cut to 100 mm in length and multiple specimens assembled in weatherometer window frames. Plastic sheets made in example 3 were cut into strips 25 mm width and 100 mm in length and also assembled in weatherometer frames. The specimens were then exposed in a QUV chamber according to ASTM G-154 Specimens were periodically monitored to record progress in weathering and any sudden changes in their appearance. Exposure conditions were as follows:

(A) 8 hours UV light (UVA 340 lamps with irradiance 0.68 w/m²/nm) at 60° C., 5 minutes water spray, 3 hours 55 min. condensation at 50° C.

(B) 8 hours UV light UV light (UVA 340 lamps with irradiance 0.77 W/m2/nm) at 60 C., 4 hours condensation cycle and 2 hours soak in distilled water or sulfuric acid solution with pH 3 followed by 2 hours drying at 23° C. every 24 hours, instead of condensation.

(C) 8 h UV light (UVB 313 EL lamps with irradiance 0.77 W/m2/mn) at 60° C. and 4 hours condensation cycle at 50° C.

(D) 8 hours UV light (UVB 313 lamps with irradiance 0.77 W/m2/nm) at 70° C. and 4 hours condensation cycles at 50° C.

Example 5

Samples of wood plastic composites were exposed to sun in exterior conditions in Vancouver, British Columbia (condition Vr in table 4) and Valencia, Calif. (condition Va in table 4) for a period of one year. In addition to natural moisture, samples exposed in Valencia were additionally sprinkled with approximately 0.5 inch of water per day in the form of lawn irrigation.

Example 6

Specimens having 0.5 mm thickness were cut from the board samples prepared in Example 1 and exposed to 2000 h accelerated weathering as described in Example 4. These 0.5 mm thick specimens with one surface exposed to weathering were then broken into small pieces and approximately 0.3 g of material was placed in a 200 mesh stainless steel pouch. The pouch was placed in a round-bottomed flask with 100 ml of xylene [xylene isomers plus ethyl benzene b.p. 136-140° C. (Sigma-Aldrich)] with 1% suitable antioxidant and boiled under condenser for 8 h. After completion of heating, hot liquid was transferred to a beaker and 15 mL of heptane [Heptane 95%, b.p. 98° F. (Sigma Aldrich)] was added dropwise with mixing. Mixture was cooled and precipitated polymer was filtered, washed and dried. Thin film specimens, 50 μm in thickness, were compression moulded from dry resin at 175° C.

FTIR transmission spectra were acquired for resin obtained from reference sample (non-exposed) and three exposed samples as mentioned above. IR absorption bands intensity measurements on infrared spectra, evaluated as described in Example 7 are shown in Table 4 and 5.

TABLE 4

Photo-oxidation of polymeric material samples, with and without borate compounds, exposed to weathering at different conditions

| | | Composition | | | Weathering | | | FTIR Height indicator of Photo-oxidation | | | |
|---|---|---|---|---|---|---|---|---|---|---|---|
| Exp't # | Sample pairs | Resin type | HALS | Wood | Conditions | Period | Environment | Without ZB | With ZB | T-test (95%) | Comments |
| I | 1 & 4 | HDPE | + | + | A | 300 h | acid | 0.241 | 0.120 | different | ATR |
| II | 1 & 4 | HDPE | + | + | A | 500 h | acid | 0.251 | 0.165 | different | ATR |
| III | 1 & 4 | HDPE | + | + | A | 500 h | distilled water | 0.229 | 0.140 | different | ATR |
| IV | 1 & 4 | HDPE | + | + | B | 2000 h | NA | 0.288 | 0.318 | NA | ATR |
| V | 1 & 4 | HDPE | + | + | B | 2000 h | NA | 1.338 | 2.167 | NA | TRANS |
| VI | 1 & 4 | HDPE | + | + | ext (Va) | 1 year | NA | 0.137 | 0.120 | different | ATR |

TABLE 4-continued

Photo-oxidation of polymeric material samples, with and without borate compounds, exposed to weathering at different conditions

| | | Composition | | | Weathering | | | FTIR Height indicator of Photo-oxidation | | | |
|---|---|---|---|---|---|---|---|---|---|---|---|
| Exp't # | Sample pairs | Resin type | HALS | Wood | Conditions | Period | Environment | Without ZB | With ZB | T-test (95%) | Comments |
| VII | 1 & 4 | HDPE | + | + | ext (Vr) | 1 year | NA | 0.228 | 0.186 | different | ATR |
| VIII | 1 & 2 | HDPE | + | + | ext (Va) | 1 year | NA | 0.137 | 0.122 | different | ATR |
| IX | 2 & 4 | HDPE | + | + | ext (Va) | 1 year | NA | 0.122 | 0.120 | different | ATR |
| X | 5 & 6 | HDPE | − | + | A | 300 h | acid | 0.375 | 0.296 | different | ATR |
| XI | 5 & 6 | HDPE | − | + | A | 500 h | acid | 0.397 | 0.326 | different | ATR |
| XII | 5 & 6 | HDPE | − | + | A | 500 h | distilled water | 0.398 | 0.317 | different | ATR |
| XIII | 5 & 6 | HDPE | − | + | ext (Va) | 1 year | NA | 0.163 | 0.159 | ambiguous | ATR |
| XIV | 5 & 6 | HDPE | + | + | B | 2000 h | NA | NA | 0.378 | NA | ATR |
| XV | 5 & 6 | HDPE | + | + | B | 2000 h | NA | 5.943 | 3.961 | ambiguous | TRANS |
| XVI | 8 & 11 | HDPE | − | + | B | 2000 h | NA | 2.562 | 1.333 | NA | TRANS |
| XVII | 27 & 28 | HDPE | + | + | A | 500 h | acid | 0.163 | 0.127 | different | ATR |
| XVIII | 27 & 28 | HDPE | + | + | A | 500 h | distilled water | 0.156 | 0.104 | different | ATR |
| XIX | 27 & 28 | HDPE | + | + | B | 100 h | NA | 0.086 | 0.084 | NA | ATR. |
| XX | 27 & 28 | HDPE | + | + | B | 2000 h | NA | 2.600 | 2.230 | NA | TRANS |
| XXI | 29 | HDPE | + | + | B | 2000 h | NA | 0.087 | NA | NA | ATR |
| XXII | 31 & 33 | HDPE | + | + | B | 2000 h | NA | 2.419 | 1.059 | ambiguous | TRANS |
| XXIII | 301&302 | PP | − | + | A | 356 h | acid | 0.813 | 0.851 | ambiguous | ATR |
| XXIV | 301&302 | PP | − | + | A | 356 h | distilled water | 0.910 | 0.775 | different | ATR |
| XXV | 311&312 | PP | + | + | A | 356 h | acid | 0.859 | 0.685 | different | ATR |
| XXVI | 311&312 | PP | + | + | A | 500 h | distilled water | 0.846 | 0.818 | ambiguous | ATR |
| XXVII | 315&316 | PP | + | + | A | 500 h | acid | 0.640 | 0.714 | different | ATR |
| XXVIII | 315&316 | PP | + | + | A | 500 h | distilled water | 0.658 | 0662 | similar | ATR |
| XXIX | 041104-1 & 041104-4 | PE | − | − | D | 155 h | NA | 3.308 | 2.807 | different | TRANS. |
| XXX | 050505-8 & 050505-9* | PE | − | − | D | 155 | NA | 1.689 | 0.104* | different | TRANS |
| XXXI | 041104-1 & 050505-12* | PE | − | − | D | 155 h | NA | 3.308 | 2.372* | different | TRANS |
| XXXII | 041104-1 & 050505-13** | PE | − | − | D | 155 | NA | 3.308 | 0.589** | different | TRANS |
| XXXIII | 041104-5 & 041105-3 | PE | − | − | C | 1000 h | NA | 0254 | 0.109 | different | TRANS |
| XXXIV | 041104-5 & 041105-3 | PE | − | − | C | 1500 h | NA | 0.683 | 0.330 | different | TRANS |
| XXXV | 050505-1 & 050505-11 | PE | − | − | D | 700 h | NA | 1.333 | 0.886 | similar | TRANS |

*Boric Acid
**Sodium Borate

Lower IR absorption bands in the carbonyl group region for transmittance or absorbance spectra indicates reduced oxidation of the HDPE plastic resin. The addition of zinc borate to plastic compositions with and without hindered amine light stabilizer (HALS), reduced polyethylene oxidation caused by UV radiation. These results show a substantial reduction in photo-oxidation of polyethylene in wood-plastic composites when 2-3% by weight zinc borate is added.

Example 7

Exposed specimens were assessed for their degree of polymer photooxidation based on FTIR data and optionally for color change and degree of surface degradation. Evaluations were conducted as follow:
1. Color change (ΔE) according to ASTM D2244 using Gretag-Macbeth spectrophotometer (Measurement conditions: color equation LCH, angle 10 deg., Illuminant D 65, reflectance mode with regular aperture).
2. Degree of surface degradation based on microscopic evaluation (under magnification 25-100×) using a Leica MZ-12 stereoscopic microscope
3. Photo-oxidation was assessed based on the infrared absorbance band in the 1720 $cm^{-1}$ region. IR spectra were obtained using an AVATAR FTIR Spectrometer (Thermo-Nicolet). For the ATR method applied to wood plastic composite surface, the Split Pea® accessory was used. Peak height corrections were conducted using the 1470 cm−1 region absorption band as the reference for polyethylene and 1160 cm−1 for polypropylene. An additional correction factor was also introduced to the reference peak in polyethylene spectra in respect to crystallinity. 27 ATR spectra were collected for each sample and averaged prior to evaluation. For the transmission method applied to 0.5 mm thick plastic strips, absorbance spectra were again evaluated at around 1720 cm−1, with the 2018 cm−1 region absorption band as the reference. Three strips were evaluated for each composition, with five spectra acquired for each strip. All fifteen spectra were averaged prior to analysis. For all methods, results are presented as a ratio of the 1720 cm−1 absorption peak height to the selected reference peak height. This is subsequently referred to as the Height Indicator of Photooxidation. T-tests were applied to data obtained for pairs of equivalent samples with and without borates (or, for certain tests, HALS) to distinguish results. Sample pairs were judged different from each other if the t-test met or exceeded a 95% confidence interval.

In the infrared transmittance spectral analysis, the height of the band at around 1720 cm$^{-1}$ was measured as an indicator of the creation of carbonyl groups in the polymer, as is known to be a result of photo-degradation. To correct any small variation in sample thickness, the selected reference peak height was measured as well, and the ratio of the peaks was calculated. (Height Indicator of Photooxidation)

Decreased oxidation of the HDPE (high density polyethylene) or PP (polypropylene) plastic is visible as a decrease the height of the absorption band at around 1720 cm$^{-1}$. In some cases, the result of this improvement in stabilization was seen as decreased color change or reduced surface degradation in the form of cracking, as is visible in sample #27. Results comparing the performances of tested samples in respect to relative height of absorption band at around 1720 cm$^{-1}$ for pairs of similar samples with and without zinc borate (or, for certain tests, HALS) made according to examples 1, 2 and 3 and exposed to weathering according to Example 4 and 5 are shown in Table 4.

XVII-XX, XXII, , and XXV in Table 4. The increased UV resistance of WPC materials in the presence of ZB, both with and without HALS, is also observed in acidic conditions, as is shown in Experiments I, II, X, XI, XVII, XXIII, and XXV in Table 4. Such evaluation statistically confirm data shown in table 5

The color change was evaluated for all polyethylene WPC samples subject to accelerated weathering at 100 hours and 2,000 hours accelerated weathering, with somewhat mixed results. Samples #5&6 (pine without HALS) and samples #31&33 and #27, 28 &29 (oak with HALS) showed less color change at 100 h with zinc borate than without, while sample pairs #1&4 and #8&11 (both pine with HALS) indicated more color change with zinc borate. At 2,000 hours samples #27, 28 &29 again showed substantially greater resistance to color change with zinc borate than without, while sample pair #1&4 indicated slightly more color change with zinc borate. Color change in WPC materials, however, may be due to the photo-oxidation of chromophores present in the wood as well as to photo-oxidation of the polymer binder.

Surface degradation was evaluated on only two sample pairs. Samples #27, 28 &29 (about 50% oak with HALS) showed less surface degradation with zinc borate than without, especially after 2,000 hours accelerated weathering,

TABLE 5

Evaluation of properties of wood plastic composites containing HALS, with and without zinc borate, after exposure to accelerated weathering

| | | Accelerated Weathering Exposure | | | | | |
| --- | --- | --- | --- | --- | --- | --- | --- |
| | | 100 hours | | | 2000 hours | | |
| Sample # | Zinc borate content % | Color Change ΔE | Degree of surface degradation* | Height indicator of photo-oxidation | Color Change ΔE | Degree of surface degradation* | Height indicator of photo-oxidation |
| 1 | 0 | 1.0 | 1-2 | — | 5.1 | 7-8 | 0.318 |
| 4 | 3 | 1.2 | 1-2 | — | 5.4 | 7-8 | 0.288 |
| 5 | 0 | 2.4 | — | 0.231 | 26.7 | — | 0.378 |
| 6 | 3 | 1.5 | — | — | 26.7 | — | — |
| 8 | 0 | 2.5 | — | — | 5 | — | — |
| 11 | 3 | 4.8 | — | — | 4.6 | — | — |
| 27 | 2 | 0.8 | 1 | 0.086 | 7.6 | 5 | 0.260 |
| 28 | 0 | 2.2 | 1-2 | 0.084 | 12.6 | 7-8 | 0.312 |
| 29 | 2 | 0.3 | 1 | 0.087 | 8.9 | 5-6 | — |
| 31 | 2 | 3.3 | — | — | 15.5 | — | — |
| 33 | 0 | 4.8 | — | — | 15.5 | — | — |

*Assessment of surface degradation based on scale from 0 to 10 (0 - no change to the surface, 10 - very strong degradation).
**Increased absorbance is directly related to increased polymer oxidation by the UV induced degradation process.

Results:

An evaluation of infrared (IR) absorbance spectra was made for all samples, and the results compared for pairs of samples as described in Table 4. The addition of borates to polymeric materials made without wood improves the UV resistance of those materials, as is seen in Experiments XXIX, XXXI, and XXXII in Table 4. Some borates, in particular ZB, also show synergistic effects with HALS in increasing the UV resistance of polymeric materials, as is shown in Experiments XXXIII, XXXIV, and XXXV in Table 4. Wood-plastic composite materials made without HALS also show increased UV resistance with the addition of ZB, as is shown in Experiments X through XVI, XXII, XXIII, and XXIV in Table 4. Wood-plastic composite materials containing both ZB and HALS show a synergistically increased resistance to UV radiation, as is seen in Experiments I-IX, while sample pair #1&4 (about 50% pine with HALS) seems to show no difference with and without zinc borate. Both pairs of samples show significantly less photodegradation with ZB when tested by FTIR spectroscopy.

Height Indicators of Photooxidation were measured on sample pairs #5&6 (about 50% pine without HALS), #1&4 (about 50% pine with HALS), and #27&28 (about 50% oak with HALS), after 2,000 hours weathering. (table 4 and 5). In each case the IR results indicated less photo-oxidation with zinc borate than without. Sample pair #27&28 also showed better results with zinc borate after 100 hours weathering. In fact, sample pair #27&28 yielded better results with zinc borate at both accelerated weathering times by all three evaluation methods (color change, surface degradation and IR determination of photo-oxidation).

Various changes and modifications of the invention can be made and to the extent that such changes and modifications incorporate the spirit of this invention, they are intended to be included within the scope of the appended claims.

What is claimed is:

1. A method of stabilizing organic material in a wood-plastic composite against degradation by ultraviolet radiation, wherein the wood-plastic composite comprises thermoplastic resin and wood particles, said method comprising incorporating from about 0.1 to about 5 percent by weight boron compound and from about 0.05 to 5 percent by weight of a hindered amine light stabilizer into the organic material, thereby forming a light stabilized organic composition, said percentages based on the total weight of the composition, wherein the boron compound comprises boric oxide, boric acid, cationic salts of boric acid, or mixtures thereof, and wherein the cations have an atomic or molecular weight less than 130 atomic mass units (AMU).

2. The method according to claim 1 wherein the boron compound is zinc borate.

3. The method according to claim 1 wherein the organic material is exposed to acidic environmental conditions in a pH range of about 2 to about 5.

4. The method according to claim 1 wherein the thermoplastic resin is selected from the group consisting of polyethylene, polypropylene and polyvinyl chloride.

5. The method according to claim 2 wherein the wood-plastic composite contains from about 1 to about 3 percent by weight zinc borate, said percentage based on the total weight of the composite.

6. A method for enhancing the light stabilizing performance of a hindered amine light stabilizer in a wood-plastic composite, wherein the wood-plastic composite comprises thermoplastic resin and wood particles, said method comprising incorporating into the composite from about 0.05 to 5 percent by weight of a hindered amine light stabilizer and from about 0.1 to 5 percent by weight zinc borate, thereby forming an organic composition with enhanced light stability compared with the same composition without zinc borate, said percentages based on the total weight of the composition.

7. The method according to claim 6 wherein the composite is exposed to acidic environmental conditions in a pH range of about 2 to about 5.

8. The method according to claim 6 wherein the composition contains from about 0.1 to 2 percent by weight of a hindered amine light stabilizer and from about 1 to 3 percent by weight zinc borate, said percentages based on the total weight of the composition.

9. The method according to claim 6 wherein the hindered amine light stabilizer is bis(2,2,6,6-tetramethyl-4-piperidyl) sebacate or a mixture of poly[[6-[(1,1,3,3-tetramethylbutyl)amino]-1,3,5-triazine-2-4-diyl][(2,2,6,6-tetramethyl-4-piperidinyl)imino]-1,6-hexanediyl[(2,2,6,6-tetramethyl- 4-piperidinyl)imino]]), butanedioic acid, dimethylester, and polymer with 4-hydroxy-2,2,6,6-tetramethyl-l-piperidine ethanol.

10. The method according to claim 6 wherein the thermoplastic resin is selected from the group consisting of polyethylene, polypropylene and polyvinyl chloride.

11. The method according to claim 6 wherein an ultraviolet light absorber is also incorporated into the composite.

12. A light stabilized composition comprising thermoplastic resin, wood particles, from about 0.05 to 5 percent by weight of a hindered amine light stabilizer and from about 0.1 to about 5 percent by weight boron compound, said percentage based on the total weight of the composition, wherein the boron compound comprises boric oxide, boric acid, cationic salts of boric acid, or mixtures thereof, and wherein the cations have an atomic or molecular weight less than 130 atomic mass units (AMU).

13. The light stabilized composition according to claim 12 wherein the composition is exposed to acidic environmental conditions in a pH range of about 2 to about 5.

14. The composition according to claim 12 wherein the hindered amine light stabilizer is bis (2,2,6,6-tetramethyl-4-piperidyl) sebacate or a mixture of poly[[6-[(1,1,3,3-tetramethylbutyl)amino]-1,3,5-triazine-2-4-diyl][(2,2,6,6-tetramethyl-4-piperidinyl)imino]-1,6-hexanediyl[(2,2,6,6-tetramethyl-4-piperidinyl)imino]]), butanedioic acid, dimethylester, and polymer with 4-hydroxy-2,2,6,6-tetramethyl-1-piperidine ethanol.

15. The composition according to claim 12 which also comprises an ultraviolet light absorber.

16. The composition according to claim 15 wherein the ultraviolet light absorber is 2-(2H-Benzotriazole-2-yl)-4 methylphenyl.

17. The composition according to claim 12 wherein the boron compound content is in the range of about 1 to about 3 percent by weight, and the hindered amine light stabilizer content is in the range of about 0.1 to about 2 percent by weight, said percentages based on the total weight of the composition.

18. The composition according to claim 12 wherein the thermoplastic resin is selected from the group consisting of polyethylene, polypropylene and polyvinyl chloride.

19. The composition according to claim 12 which comprises from about 30 to about 80 percent by weight wood particles, said percentage based on the total weight of the composition.

20. The composition according to claim 19 which also comprises an ultraviolet light absorber.

21. A wood-plastic composite article comprising from about 20 to about 70 percent by weight of a polyolefin selected from the group consisting of polyethylene and polypropylene, from about 30 to about 80 percent by weight wood particles, from about 0.1 to 5 percent by weight boron compound, from about 0.05 to 5 percent by weight of a hindered amine light stabilizer, and an ultraviolet light absorber, said percentages based on the total weight of the composite.

* * * * *